(12) United States Patent
Sun

(10) Patent No.: US 8,254,109 B2
(45) Date of Patent: Aug. 28, 2012

(54) DISK DRIVE MOUNTING DEVICE AND DISK DRIVE ASSEMBLY

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 256 days.

(21) Appl. No.: 12/791,877

(22) Filed: Jun. 2, 2010

(65) Prior Publication Data

US 2011/0267762 A1 Nov. 3, 2011

(30) Foreign Application Priority Data

Apr. 29, 2010 (CN) .......................... 2010 1 0160143

(51) Int. Cl.
  H05K 5/00 (2006.01)
  H01R 13/62 (2006.01)
  A47B 81/00 (2006.01)
  G11B 33/02 (2006.01)
(52) U.S. Cl. ......... 361/679.39; 361/679.33; 361/679.34; 361/679.35; 361/679.36; 361/679.37; 361/679.38; 361/679.43; 439/153; 439/154; 439/327; 439/328; 312/223.1; 312/223.2; 369/75.11; 369/75.21

(58) Field of Classification Search .. 361/679.31–679.4, 361/679.55–679.6, 724–727, 679.02, 679.03; 312/223.1, 223.2; 439/60, 151–160, 327, 439/328, 331, 638; 369/75.11, 75.21, 76, 369/77.11, 77.21, 78, 79, 80, 81, 82
See application file for complete search history.

(56) References Cited

U.S. PATENT DOCUMENTS 5,483,419 A * 1/1996 Kaczeus et al. .......... 361/679.39
2008/0123279 A1 * 5/2008 Chih et al. .................... 361/685
* cited by examiner Primary Examiner — Jayprakash N Gandhi
Assistant Examiner — Jerry Wu
(74) Attorney, Agent, or Firm — Altis Law Group, Inc.

(57) ABSTRACT

A disk drive mounting device for use in an electronic apparatus includes a mounting frame, fasteners, and a cover member. The mounting frame includes a mounting plate, a flange formed at a side of the mounting plate, and a plurality of mounting ears extending outwardly from the mounting plate. Each of the mounting ears defines at least one receiving cutout therein. In use, one end of each of the fasteners is mounted on the disk drive and the other end is received in the receiving cutout of a corresponding mounting ear. The cover member is secured on the flange of the mounting frame and abuts the at least one disk drive to prevent the fasteners from disengaging from the receiving cutouts of the mounting ears. A disk drive assembly is also provided.

8 Claims, 3 Drawing Sheets

DISK DRIVE MOUNTING DEVICE AND DISK DRIVE ASSEMBLY

BACKGROUND

1. Technical Field

The present disclosure generally relates to mounting devices, and more particularly to a disk drive mounting device and a disk drive assembly.

2. Description of Related Art

An electronic device, such as a computer, often includes a case and a plurality of disk drives such as a compact disc read-only memory (CD-ROM) drive and a hard disk drive (HDD) accommodated in the case. A plurality of mounting frames is provided in the case for securing the disk drives in the case. Each of the mounting frames has a mounting pole protruding outwardly therefrom. A plurality of sliding slots is defined in a side plate of the case. Each of the disk drives is mounted on a corresponding mounting frame, which is then slid into the case by the mounting pole moving along the corresponding sliding slot to a predetermined securing position.

However, during assembly, the mounting frame must travel a predetermined distance, which means that corresponding free space for allowing such travel is required in the case. Unfortunately, such requirement impedes ongoing efforts toward reduction of device size and volume.

Therefore, what is needed is a disk drive mounting device which can overcome the described limitations.

DETAILED DESCRIPTION

Figure 1:
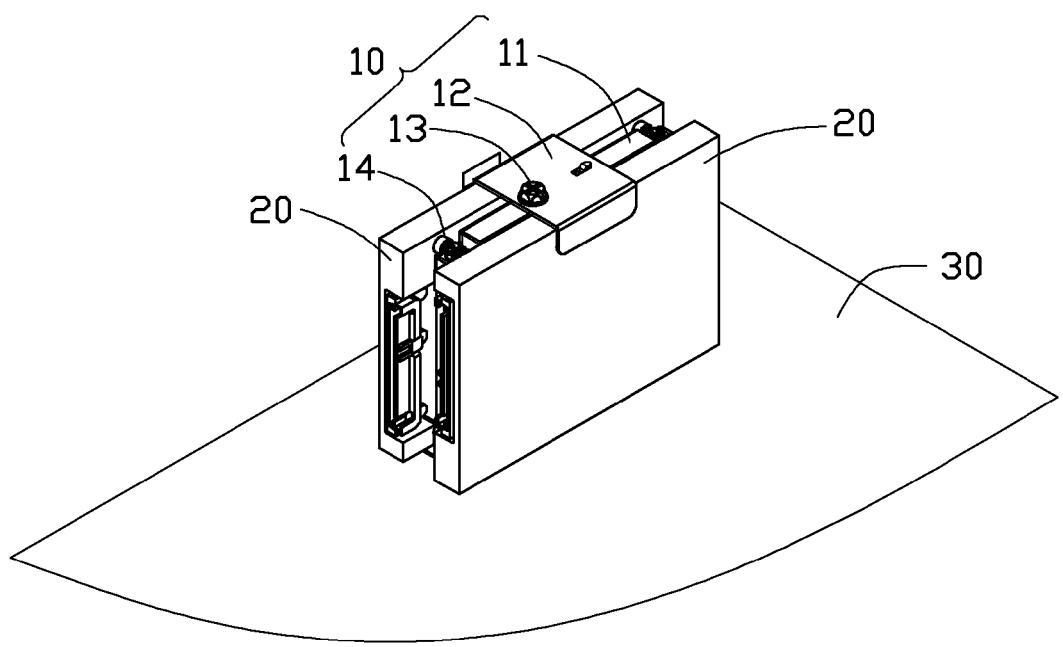
FIG. 1 is an isometric, assembled view of a disk drive assembly in accordance with an embodiment of the present disclosure, but only showing part of a case of the disk drive assembly.

Referring to FIG. 1, a disk drive assembly according to an embodiment of the present disclosure is shown. The disk drive assembly includes a case 30, a disk drive mounting device 10 mounted in the case 30, and two disk drives 20 mounted on two opposite sides of the disk drive mounting device 10. In this embodiment, the case 30 is a computer case, and for convenience, FIGS. 1 and 2 show only a portion of the case 30.

Figure 2:
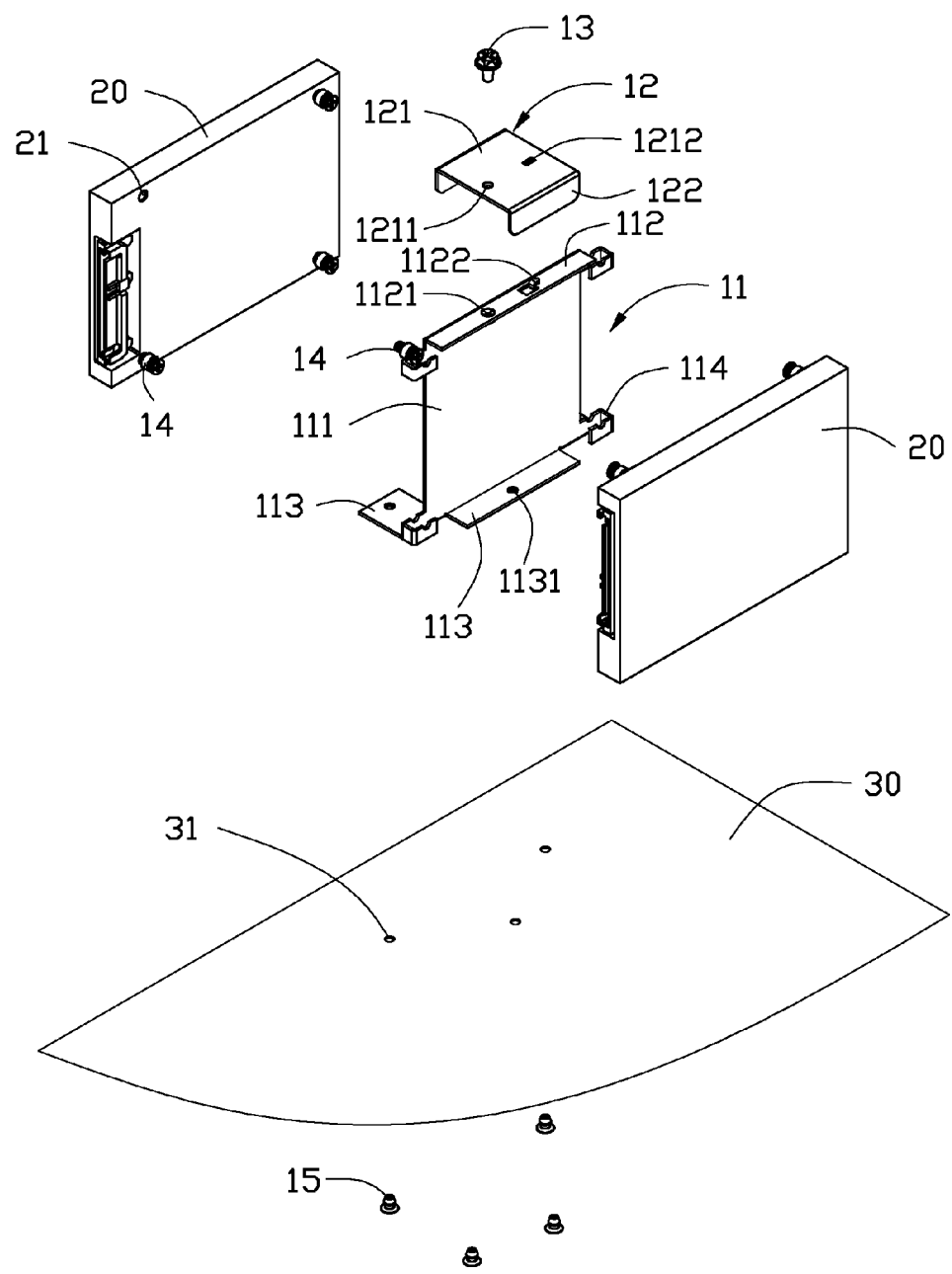
FIG. 2 is an exploded view of the disk drive assembly of FIG. 1.
Figure 3:
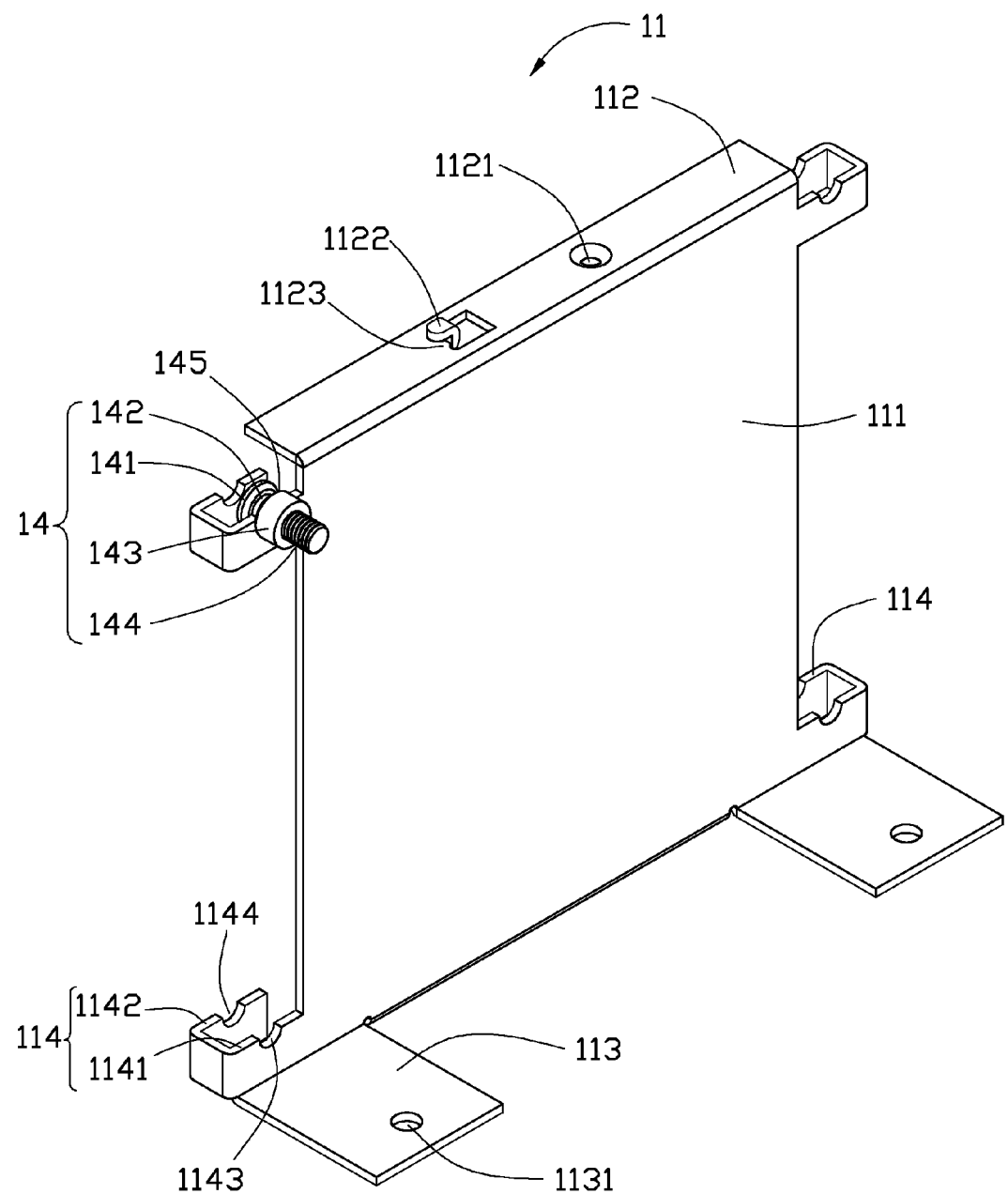
FIG. 3 is an enlarged, isometric view of a mounting frame of a disk drive mounting device of the disk drive assembly of FIG. 2.

Referring also to FIGS. 2 and 3, the disk drive mounting device 10 includes a mounting frame 11, a cover member 12, a first fastener 13 securing the cover member 12 on the mounting frame 11, and eight second fasteners 14 securing the two disk drives 20 on the mounting frame 11.

The mounting frame 11 is a single piece of metal manufactured by punching a single metal plate. The mounting frame 11 includes a planar mounting plate 111, a first flange 112 extending perpendicularly from a top side of the mounting plate 111, three second flanges 113 extending perpendicularly from a bottom side of the mounting plate 111, and four mounting ears 114 respectively extending outwardly from four corners of the mounting plate 111.

The first flange 112 defines a locking hole 1121 in a center thereof. A hook 1122 is punched integrally outwardly from the first flange 112 near the locking hole 1121. The locking hole 1121 and the hook 1122 are arranged parallel to the mounting plate 111. The hook 1122 is L-shaped. The hook 1122 extends upwardly perpendicularly from the first flange 112 and then extends horizontally away from the locking hole 1121. A latching groove 1123 is defined between a free end of the hook 1122 and the first flange 112.

The three second flanges 113 include one second flange 113 at the center of the bottom side of the mounting plate 111, and two second flanges 113 at two opposite sides of the middle second flange 113. The middle flange 113 extends perpendicularly from the mounting plate 111 towards the front disk drive 20 (as viewed in FIGS. 1 and 2), and the two second flanges 113 at the two opposite sides of the middle second flange 113 extend perpendicularly from the mounting plate 111 towards the rear disk drive 20 (as viewed in FIGS. 1 and 2). Each of the second flanges 113 defines a mounting hole 1131 therein.

The four mounting ears 114 are symmetrically arranged at the four corners of the mounting plate 111. Each of the mounting ears 114 is n-shaped when viewed from above. Each of the mounting ears 114 extends outward in a horizontal direction from the mounting plate 111 and then doubles back toward the mounting plate 111. The mounting ear 114 includes a first mounting tab 1141 extending outward in a horizontal direction from the mounting plate 111, and a second mounting tab 1142 parallel to and facing the first mounting tab 1141. A free end of the first mounting tab 1141 connects with an end of the second mounting tab 1142 farthest away from the mounting plate 111 via a perpendicular connecting portion (not labeled). The first mounting tab 1141 defines a first receiving cutout 1143 in a top side thereof. The second mounting tab 1142 defines a second receiving cutout 1144 in a top side thereof. The first receiving cutout 1143 of the first mounting tab 1141 is aligned with the second receiving cutout 1144 of the second mounting tab 1142. The first receiving cutout 1143 and the second receiving cutout 1144 are semicircular, with the straight side of the semicircle at the top. Thus the first and second receiving cutouts 1143, 1144 can be considered to be oriented upward, facing towards the first flange 112 of the mounting frame 11.

The cover member 12 is saddle-shaped, and includes a planar abutting plate 121, and two positioning flanges 122 extending downwardly from two opposite sides of the abutting plate 121. The abutting plate 121 defines a through hole 1211 in a center thereof and a latching hole 1212 adjacent to the through hole 1211, which respectively correspond to the locking hole 1121 and the hook 1122 of the first flange 112 of the mounting frame 11. The two positioning flanges 122 are parallel to the mounting plate 111 of the mounting frame 11 and at rear and front sides of the mounting plate 111.

The first fastener 13 can be a screw. The second fastener 14 includes a head portion 141, a neck portion 142, a blocking portion 143, and an engaging portion 144. The head portion 141 and the engaging portion 144 are at two opposite ends of the second fastener 14. The blocking portion 143 is substantially at a middle of the second fastener 14. The neck portion 142 is between the head portion 141 and the blocking portion 143. A diameter of the neck portion 142 is less than that of each of the head portion 141 and the blocking portion 143. An annular notch 145 is defined between the head portion 141 and the blocking portion 143, and the annular notch 145 surrounds the neck portion 142.

The two disk drives 20 are rectangular. In this embodiment, the two disk drives 20 are two HDDs. In one alternative embodiment, the disk drives 20 may be CD-ROM drives. Each of the two disk drives 20 defines four receiving holes 21 at four corners thereof, respectively.

The case 30 defines three through holes 31 therein, corresponding to the mounting holes 1131 of the second flanges 113 of the mounting frame 11.

In assembly, each of the mounting holes 1131 of the second flanges 113 of the mounting frame 11 is aligned with a corresponding through hole 31 of the case 30, thereby allowing a third fastener 15 to pass therethrough for securing the mounting frame 11 in the case 30. The second fasteners 14 are mounted on the two disk drives 20, with the engaging portions 144 received in the receiving holes 21 of the two disk drives 20 respectively. One of the two disk drives 20 (i.e., the front disk drive 20) is mounted at one side, here, the front side, of the mounting frame 11, with the neck portions 142 of the four corresponding second fasteners 14 thereon respectively received in the first receiving cutouts 1143 of the mounting ears 114. The other disk drive 20, the rear, is mounted at the other side, here, the rear side, of the mounting frame 11, with the neck portions 142 of the four corresponding second fasteners 14 thereon respectively received in the second receiving cutouts 1144 of the mounting ears 114.

Then the cover member 12 is disposed on the first flange 112 of the mounting frame 11, with the latching hole 1212 thereof aligned with the hook 1122 of the first flange 112. The hook 1122 extends through the latching hole 1212, whereupon the two disk drives 20 are between the two positioning flanges 122 of the cover member 12. The cover member 12 is moved in a direction opposite to a direction in which the free end of the hook 1122 points, until the abutting plate 121 of the cover member 12 is latched in the latching recess 1123 between the free end of the hook 1122 and the first flange 112 of the mounting frame 11. In this state, the through hole 1211 of the cover member 12 is aligned with the locking hole 1121, and the first fastener 13 is passed through the through hole 1211 and the locking hole 1121 to secure the cover member 12 on the mounting frame 11. The abutting plate 121 of the cover member 12 abuts the two disk drives 20 to prevent the second fasteners 14 from disengaging from the first and second receiving cutouts 1143, 1144 of the mounting ears 114. The two disk drives 20 are thus firmly secured on the mounting frame 11.

In the present disk drive assembly, the disk drives 20 and the disk drive mounting device 10 are not required to slide in the case 30 during assembly, and an sliding space for such operation is therefore not required. The disk drive assembly can thus be utilized in an electronic apparatus with limited inner space. In addition, one disk drive mounting device 10 can secure two disk drives 20. Accordingly, the number of disk drive mounting devices 10 required in the case 30 is reduced. This not only reduces a cost of the electronic device, but also spares much space in the case 30.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk drive mounting device configured for securing at least one disk drive in an electronic apparatus, the disk drive mounting device comprising:
    a mounting frame comprising a mounting plate,
    a first flange formed at a side of the mounting plate, and at least one mounting ear which extend outwardly from each of four corners of the mounting plate, respectively; and
    the at least one mounting ear comprises a first mounting tab extending from the mounting plate and a second mounting tab parallel to and facing the first mounting tab extending outwardly from the mounting plate, each of the mounting ears defining a plurality of receiving cutouts therein and one of the receiving cutouts is defined in the first mounting tab, and the other one of the two receiving cutouts is defined in the second mounting tab;
    a plurality of fasteners; and
    a cover member; wherein one end of each of the fasteners is configured to be mounted on the at least one disk drive, and the other end of each of the fasteners is configured to be received in the receiving cutout of a corresponding mounting ear, the cover member and the first flange of the mounting frame together comprise a latch mechanism such that the cover member is capable of being detachably secured on the first flange, and the cover member is structured such that the cover member abuts the at least one disk drive to prevent the fasteners from disengaging from the receiving cutouts of the mounting ears when the cover member is secured on the first flange.

2. The disk drive mounting device of claim 1, wherein each of the mounting ears is n-shaped when viewed from a position normal to the first flange.

3. The disk drive mounting device of claim 1, wherein the receiving cutout of the first mounting tab is aligned with the receiving cutout of the second mounting tab.

4. The disk drive mounting device of claim 1, wherein each of the fasteners comprises a head portion, a neck portion, a blocking portion and an engaging portion, the neck portion is between the head portion and the blocking portion, a diameter of the neck portion is less than that of each of the head portion and the blocking portion, an annular notch is defined between the head portion and the blocking portion, the annular notch surrounds the neck portion, the engaging portion is configured to be mounted on the at least one disk drive, and the neck portion is capable of being received in the receiving cutout of a corresponding mounting ear of the mounting frame to prevent the fastener from disengaging from the receiving cutout.

5. The disk drive mounting device of claim 1, wherein the latch mechanism comprises a locking hole defined in the first flange of the mounting frame, a hook formed on the first flange, a latching groove defined between a free end of the hook and the first flange, and a through hole and a latching hole defined in the cover member corresponding respectively to the locking hole and the hook, and the cover member is latched in the latching recess and the through hole of the cover member is aligned with the locking hole when the cover member is secured on the first flange.

6. The disk drive mounting device of claim 5, wherein the cover member comprises an abutting plate and two positioning flanges formed at two opposite sides of the abutting plate, the through hole and the latching hole are defined in the abutting plate, and the two positioning flanges are at two opposite sides of the mounting plate.

7. The disk drive mounting device of claim 5, wherein at least one second flange is formed on a side of the mounting plate opposite to the side that has the first flange, for securing the mounting frame.

8. The disk drive mounting device of claim 1, wherein the receiving cutouts of the mounting ears are semicircular, and open sides of the receiving cutouts are oriented facing towards the first flange.

* * * * *